United States Patent
Punzenberger et al.

(10) Patent No.: US 11,137,748 B2
(45) Date of Patent: Oct. 5, 2021

(54) WELDING CONTROL SYSTEM

(71) Applicant: Fronius International GmbH, Pettenbach (AT)

(72) Inventors: Peter Punzenberger, Edt bei Lambach (AT); Philipp Haider, Michaelnbach (AT); Gerald Sessler, Wels (AT); Markus Stoeger, Vorchdorf (AT)

(73) Assignee: Fronius International GmbH, Pettenbach (AT)

( * ) Notice: Subject to any disclaimer, the term of this patent is extended or adjusted under 35 U.S.C. 154(b) by 1081 days.

(21) Appl. No.: 14/484,332

(22) Filed: Sep. 12, 2014

(65) Prior Publication Data
US 2016/0077519 A1 Mar. 17, 2016

(51) Int. Cl.
*G05B 19/418* (2006.01)
*B23K 9/095* (2006.01)
(Continued)

(52) U.S. Cl.
CPC ........ *G05B 19/41875* (2013.01); *B23K 9/095* (2013.01); *B23K 9/0953* (2013.01); *B23K 9/0956* (2013.01); *B23K 31/125* (2013.01); *G05B 19/4184* (2013.01); *G05B 23/0294* (2013.01); *G06Q 10/0639* (2013.01);
(Continued)

(58) Field of Classification Search
USPC ................................................ 702/81–84, 90
See application file for complete search history.

(56) References Cited

U.S. PATENT DOCUMENTS 4,596,917 A * 6/1986 Nied .................... B23K 11/252
219/109
4,877,940 A * 10/1989 Bangs .................. B23Q 35/127
219/124.34
(Continued)

FOREIGN PATENT DOCUMENTS

EP 1 786 588 B1 10/2013
HU WO 8402866 A1 * 8/1984 ............... B23K 9/10
(Continued)

OTHER PUBLICATIONS

Dictionary definition of "entity"; https://www.dictionary.com/browse/entity# (Year: 2019).*
(Continued)

*Primary Examiner* — Catherine T. Rastovski
*Assistant Examiner* — Leonard S Liang
(74) *Attorney, Agent, or Firm* — Maginot, Moore & Beck LLP (57) ABSTRACT

A welding control system is provided for monitoring welding operations of a plurality of welding units within a production facility configured to provide weld data associated with the respective mechanical entities, including a determination unit configured to determine for each type of mechanical entity a corresponding welding error rate on the basis of weld data received from welding units of the production facility, a calculation unit configured to calculate for each type of mechanical entity the number of faulty mechanical entities of the respective entity type depending on the number of mechanical entities used and configured to weight the calculated number of faulty mechanical entities of the respective entity type with a predetermined manufacturing effort value.

18 Claims, 2 Drawing Sheets

Selection
Date: [01/01/2014] [01/15/2014] [Last week] [Last month]
Location:
[Refresh] [Reset]

| | Name | Part Article Number | Scrap Costs (€) | Parts (Total) | Scrap | WER |
|---|---|---|---|---|---|---|
| 1 | MET1 | 42.4242.4242 | 32700€ | 6693 | 327 | 4,9% |
| 2 | MET2 | 40.0000.0003 | 9991€ | 867 | 103 | 11,9% |
| 3 | MET3 | 40.0000.0017 | 8400€ | 1299 | 120 | 9,2% |
| 4 | MET4 | 40.0000.0001 | 8217€ | 1167 | 99 | 8,5% |
| 5 | MET5 | 40.0000.0012 | 6783€ | 968 | 119 | 12,3% |
| 6 | MET6 | 40.0000.0007 | 5822€ | 799 | 82 | 10,3% |
| 7 | MET7 | 40.0000.0014 | 5041€ | 1360 | 71 | 5,2% |
| 8 | MET8 | 40.0000.0015 | 4284€ | 314 | 51 | 15,2% |
| 9 | MET9 | 40.0000.0005 | 3570€ | 886 | 42 | 4,7% |
| 10 | MET10 | 40.0000.0008 | 3276€ | 1251 | 182 | 14,5% |

(51) Int. Cl.
   *B23K 31/12* (2006.01)
   *G06Q 10/06* (2012.01)
   *G05B 23/02* (2006.01)
   *B23K 9/02* (2006.01)

(52) U.S. Cl.
   CPC ............... *B23K 9/02* (2013.01); *B23K 31/12* (2013.01); *G05B 2219/37217* (2013.01); *G05B 2219/45135* (2013.01); *Y02P 90/02* (2015.11)

(56) References Cited

U.S. PATENT DOCUMENTS

| | | | | |
|---|---|---|---|---|
| 5,676,867 | A * | 10/1997 | Van Allen | B23K 9/205 219/130.1 |
| 6,583,386 | B1 * | 6/2003 | Ivkovich | B23K 9/0953 219/125.1 |
| 6,636,776 | B1 * | 10/2003 | Barton | B23K 9/1062 219/109 |
| 6,697,701 | B2 * | 2/2004 | Hillen | G05B 19/042 219/110 |
| 6,795,778 | B2 * | 9/2004 | Dodge | B23K 9/0953 219/110 |
| 6,857,553 | B1 * | 2/2005 | Hartman | B23K 20/121 228/103 |
| 7,208,697 | B2 | 4/2007 | Blankenship et al. | |
| 8,224,881 | B1 * | 7/2012 | Spear | B23K 9/0953 707/899 |
| 8,569,646 | B2 * | 10/2013 | Daniel | B23K 9/0953 219/110 |
| 8,884,177 | B2 * | 11/2014 | Daniel | B23K 9/0953 219/61.5 |
| 9,468,988 | B2 * | 10/2016 | Daniel | B23K 31/12 |
| 2004/0068341 | A1 * | 4/2004 | Minucciani | B23K 26/03 700/110 |
| 2004/0122550 | A1 * | 6/2004 | Klimko | B23K 31/02 700/212 |
| 2005/0071029 | A1 * | 3/2005 | Yamamoto | G06Q 10/06 700/97 |
| 2005/0103767 | A1 * | 5/2005 | Kainec | B23K 11/252 219/130.5 |
| 2006/0006156 | A1 * | 1/2006 | Huonker | B23K 26/03 219/121.64 |
| 2009/0173726 | A1 | 7/2009 | Davidson et al. | |
| 2011/0114615 | A1 * | 5/2011 | Daniel | B23K 9/095 219/137 R |
| 2011/0246395 | A1 * | 10/2011 | Dolson | F01N 13/0097 705/400 |
| 2012/0205359 | A1 * | 8/2012 | Daniel | B23K 9/0953 219/130.01 |
| 2013/0001209 | A1 * | 1/2013 | Hirota | B23K 9/0953 219/130.01 |
| 2013/0248505 | A1 * | 9/2013 | Anayama | B23K 31/125 219/130.01 |
| 2013/0327747 | A1 * | 12/2013 | Dantinne | B23K 9/095 219/130.21 |
| 2014/0042137 | A1 * | 2/2014 | Daniel | B23K 9/0953 219/130.5 |
| 2014/0263226 | A1 * | 9/2014 | Daniel | B23K 9/0953 219/125.1 |
| 2015/0012865 | A1 * | 1/2015 | Lamers | G06Q 10/20 715/772 |
| 2015/0125836 | A1 * | 5/2015 | Daniel | G09B 19/24 434/234 |
| 2017/0330157 | A1 * | 11/2017 | Lamers | B23K 9/0953 |
| 2019/0084069 | A1 * | 3/2019 | Daniel | G05B 19/4183 |

FOREIGN PATENT DOCUMENTS

| | | | |
|---|---|---|---|
| JP | 2267162 A * | 11/1993 | ........... B23K 9/0734 |
| JP | 2008755 A1 * | 12/2008 | ............. B23K 26/03 |

OTHER PUBLICATIONS

Dictionary definition of "mechanical"; https://www.dictionary.com/browse/mechanical?s=t (Year: 2019).*

* cited by examiner

| | Name | Part Article Number | Scrap Costs (€) | Parts (Total) | Scrap | WER |
|---|---|---|---|---|---|---|
| 1 | MET1 | 42.4242.4242 | 32700€ | 6693 | 327 | 4,9% |
| 2 | MET2 | 40.0000.0003 | 9991€ | 867 | 103 | 11,9% |
| 3 | MET3 | 40.0000.0017 | 8400€ | 1299 | 120 | 9,2% |
| 4 | MET4 | 40.0000.0001 | 8217€ | 1167 | 99 | 8,5% |
| 5 | MET5 | 40.0000.0012 | 6783€ | 968 | 119 | 12,3% |
| 6 | MET6 | 40.0000.0007 | 5822€ | 799 | 82 | 10,3% |
| 7 | MET7 | 40.0000.0014 | 5041€ | 1360 | 71 | 5,2% |
| 8 | MET8 | 40.0000.0015 | 4284€ | 314 | 51 | 15,2% |
| 9 | MET9 | 40.0000.0005 | 3570€ | 886 | 42 | 4,7% |
| 10 | MET10 | 40.0000.0008 | 3276€ | 1251 | 182 | 14,5% |

Selection
Date: 01/01/2014  01/15/2014  [Last week]  [Last month]
Location:
[Refresh] [Reset]

Fig. 4

| | | NR0 | NR1 | NR2 |
|---|---|---|---|---|
| 3-1 | demo04 9,5% | 9,8% | 34,8% | 55,8% |
| | | 9,5% | 0% | 0% |
| 3-2 | demo12 38,1% | 0% | 26,5% | 11,6% |
| 3-3 | demo45 52,4% | 0% | 8,2% | 44,2% |

← Welding Seam Number

Fig. 5

WELDING CONTROL SYSTEM

BACKGROUND

The fabrication of sophisticated modern products involves joining together many individual components mechanical entities. Where a permanent join of mechanical entities is required, welding is often a good option. Welding processes can be categorized into fusion processes and solid-phase processes. In fusion processes, the surfaces of two components to be joined are cleaned, placed together and heated while being protected from oxidation. A pool of molten metal forms and connects the components, wherein a filler rod may be used to add metal to the joint. In solid-phase processes, the metals to be joined do not melt, but they are heated, usually by friction heating generated by sliding the parts together under a normal load, wherein the metal is softened and surface contamination is removed.

Welding can be used to join the different materials, usually metals or thermoplastics. Many different welding methods are known, in particular arc welding, oxyfuel gas welding, resistance welding, solid-state welding, electro-beam welding and laser beam welding. Most welding applications are done in a controlled environment such as a production facility and repair shops and other welding processes are commonly used in a wide variety of conditions such as open air, under water and even vacuum.

Welding machines or welding units are used in many industrial sectors from the automotive industry and their suppliers, to construction, robotics and shipbuilding. A welding machine can comprise a complete set of workplace welding equipment. As the level of automation has increased in mass production facilities, and the speed of welding operation has also increased, it has become increasingly important to monitor and control welding parameters and welding operations to assure a consistent and proper joining of materials and to ensure that completed welds fall within predetermined quality parameter ranges.

To provide a high level of consistency in welds, semiautomatic, automatic or robotic welding operations or welding processes typically use welding programs or procedures that are preprogrammed for specific welding operations. These welding programs, in theory, should provide consistent and repeatable welds, irrespective of the skill of the user or welding operator. Experience, however, has shown that even in highly automated welding applications, welding parameters can and do vary significantly under same or different environmental conditions. These variations can be caused by different factors including for example variations in the parts to be welded, variations in motor and wire feed speed or variations in gas flow over time and/or variations in the distance between a welding tip and a workpiece or mechanical entity to be welded. Moreover, the welding personnel on the factory floor may be inexperienced and insufficiently trained to properly identify and correct these unwanted variations. In addition to providing predetermined welding procedures or welding operations, it is also important to monitor the performance of a welding unit and of its operator. Monitoring of the welding process allows to analyze the welding process, identify welding problems and to make corrections before a significant downtime of the facility or waste of welding material occurs.

Conventional welding control systems used in production facilities focus on the optimization of welding processes performed by a welding unit to produce a mechanical assembly which can consist of many different mechanical components or mechanical entities joined by a plurality of welding seams. Accordingly, conventional welding control systems do not take into account the complex structure of the manufactured assembly and in particular they do not take into account the impact of the optimization of a specific welding operation on the required fault efforts or fault costs for manufacturing the whole assembly. A consequence of this is that in conventional welding control systems or welding monitoring systems, it often happens that non-significant welding processes having comparatively little impact on the total fault costs of the assembly are optimized whereas other welding processes or welding operations which have a significant impact on the total fault costs of the assembly are not improved.

SUMMARY OF THE INVENTION

According to a first aspect of the present invention, a welding control system is provided. The welding control system according to the first aspect of the present invention is provided for monitoring welding operations of a plurality of welding units within a production facility configured to provide during welding operations of mechanical entities forming part of an assembly to be manufactured by said production facility weld data associated with the respective mechanical entities, wherein said welding control system comprises:

a determination unit configured to determine for each type of mechanical entity a corresponding welding error rate on the basis of weld data received from welding units of said production facility, a calculation unit configured to calculate for each type of mechanical entity the number of faulty mechanical entities of the respective entity type within said assembly depending on the number of mechanical entities used within said assembly and configured to weight the calculated number of faulty mechanical entities of the respective entity type with a predetermined manufacturing effort value.

In a possible embodiment of the welding control system according to the first aspect of the present invention, the calculation unit is configured to calculate for each type of unclaimed entity the number of faulty mechanical entities of the respective entity type within said assembly and the determined welding error rate of the respective entity type and further configured to weight the calculated number of faulty mechanical entities of the respective entity type with a predetermined manufacturing effort value of said entity type to calculate required manufacturing fault costs for the different entity types.

In a possible embodiment of the welding control system according to the first aspect of the present invention, the control system comprises an evaluation unit configured to evaluate the calculated manufacturing fault costs for identifying significant welding operations performed by welding units of said production facility.

In a possible embodiment of the welding control system according to the first aspect of the present invention, each mechanical entity of said assembly is formed by a basic mechanical entity or by a complex mechanical entity consisting of other assembled and/or welded mechanical entities.

In a further possible embodiment of the welding control system according to the first aspect of the present invention, the evaluation unit is further configured to evaluate for each entity type of a complex mechanical entity a total welding fault rate for each welding unit and/or welding operator employed in manufacturing said complex mechanical entity.

In a still further possible embodiment of the welding control system according to the first aspect of the present invention, the evaluation unit is further configured to evaluate for different welding operations performed by a welding unit and/or welding operator employed in the manufacturing of a complex mechanical entity their respective contribution to the total welding fault rate of the respective welding unit and/or welding operator.

In a still further possible embodiment of the welding control system according to the first aspect of the present invention, each welding operation is performed by a welding unit to generate a welding seam with an associated welding seam identifier to join at least two mechanical entities together for manufacturing a complex mechanical entity of said assembly employing adjustable welding parameters.

In a further possible embodiment of the welding control system according to the first aspect of the present invention, the welding parameters employed in a welding operation performed by a welding unit of the production facility comprise: a welding current, a welding voltage, a gas flow rate, a gas flow type, a wire feed speed and/or a wire type.

In a still further possible embodiment of the welding control system according to the first aspect of the present invention, the weld data provided by the welding unit of the production facility during a welding operation comprises identifiers of the affected mechanical entities,
a welding seam identifier of the produced welding seam,
a time indicator indicating the time of the welding operation,
an identifier of the welding unit,
welding parameters employed by the welding unit in the respective welding operation, and
an identifier of the welding operator.

In a still further possible embodiment of the welding control system according to the first aspect of the present invention, the calculation unit is configured to sort the entity types according to the corresponding required manufacturing fault costs calculated for the entity types to identify relevant target entity types.

In a still further possible embodiment of the welding control system according to the first aspect of the present invention, welding parameters employed during welding operations performed by welding units of said production facility to manufacture the identified relevant target entity types are identified by the evaluation unit and optimized to reduce the required manufacturing fault costs of said target entity types.

In a still further possible embodiment of the welding control system according to the first aspect of the present invention, the welding units of said production facility are connected via a network to a welding control server comprising the determination unit, the calculation unit and the evaluation unit.

In a still further possible embodiment of the welding control system according to the first aspect of the present invention, the network is provided to transport weld data from welding units of the production facility to the welding control server in real time or periodically.

In a further possible embodiment of the welding control system according to the first aspect of the present invention, the welding control server is configured to transmit fault handling control signals generated by its evaluation unit for reduction of manufacturing fault costs of target entity types via said network to welding units used to manufacture the target entity types.

In a further possible embodiment of the welding control system according to the first aspect of the present invention, the entity type of a mechanical entity is indicated by an associated article number.

In a further possible embodiment of the welding control system according to the first aspect of the present invention, each basic and/or complex mechanical entity comprises an associated unique serial number.

In a still further possible embodiment of the welding control system according to the first aspect of the present invention, weld data of a welding operation performed by a welding unit are assigned to a specific mechanical entity of the assembly on the basis of the article number and/or the serial number of the respective mechanical entity indicated by the respective welding unit of said production facility.

In a still further possible embodiment of the welding control system according to the first aspect of the present invention, the weld data of mechanical entities of the same investigated entity type received during a predetermined time period are processed by said determination unit to determine an instantaneous welding error rate for the investigated entity type.

In a still further possible embodiment of the welding control system according to the first aspect of the present invention, the weld data are provided during welding operations at least partially by sensor devices of the welding units of the production facility.

The invention further provides according to a second aspect a production facility.

The production facility according to the second aspect of the present invention comprises:
a plurality of welding units which provide weld data during welding operations of mechanical entities forming part of an assembly to be manufactured by said production facility, wherein the weld data is associated with welded mechanical entities, said production facility further comprising a welding control system configured to monitor and/or control welding operations performed by the welding units of the production facility,
wherein said welding control system comprises at least one welding control server having
a determination unit configured to determine for each type of mechanical entity a corresponding welding error rate on the basis of weld data received from welding units of said production facility,
a calculation unit configured to calculate for each type of mechanical entity the number of faulty mechanical entities of the respective entity type within said assembly and to weight the calculated number of faulty mechanical entities of the respective entity type with a predetermined manufacturing effort value.

In a possible embodiment of the production facility according to the second aspect of the present invention the calculation unit is adapted to perform the calculation of the number of faulty mechanical entities depending on the number of mechanical entities used within said assembly and the determined welding error rate of the respective entity type and is further configured to weight the calculated number of faulty mechanical entities of the respective entity type with the predetermined manufacturing effort value of said entity type to calculate required manufacturing fault costs for the different entity types.

In a possible embodiment of the production facility according to the second aspect of the present invention the welding control server further comprises an evaluation unit configured to evaluate the calculated manufacturing fault costs for identifying significant welding operations performed by welding units of said production facility.

The invention further provides according to a third aspect a welding unit of a production facility.

The welding unit according to the third aspect of the present invention is adapted to weld at least two mechanical entities at a welding seam together for generating a complex mechanical entity of an assembly to be manufactured by the production facility,
wherein said welding unit is monitored and/or controlled by a welding control system comprising at least one welding control server having
a determination unit configured to determine for each type of mechanical entity a corresponding welding error rate on the basis of weld data received from welding units of said production facility,
a calculation unit configured to calculate for each type of mechanical entity the number of faulty mechanical entities of the respective entity type within said assembly depending on the number of mechanical entities used within said assembly and the determined welding error rate of the respective entity type and further configured to weigh the calculated number of faulty mechanical entities of the respective entity type with a predetermined manufacturing effort value of said entity type to calculate required fault costs for the different entity types and
an evaluation unit configured to evaluate the calculated manufacturing fault costs for identifying significant welding operations performed by welding units of said production facility.

The invention further provides according to a fourth aspect a method for monitoring welding operations.

The method for monitoring welding operations according to the fourth aspect of the present invention is provided for monitoring welding operations of a plurality of welding units within a production facility which provide during welding operations of mechanical entities forming part of an assembly to be manufactured by said production facility weld data associated with the respective mechanical entities, the method comprising:
determining for each type of mechanical entity a corresponding welding error rate on the basis of weld data received from welding units of the production facility,
calculating for each type of mechanical entity the number of faulty mechanical entities of the respective entity type within said assembly and weighting the number of faulty mechanical entities of the respective entity type with a predetermined manufacturing effort value.

In a possible embodiment the calculating for each type of mechanical entity the number of faults mechanical entities of the respective entity type within said assembly is performed depending on the number of mechanical entities used within the assembly and the determined welding error rate of the respective entity type and weight the calculated number of faulty mechanical entities of the respective entity type with the predetermined manufacturing effort value of the entity type to calculate required manufacturing fault costs for the different entity types.

In a possible embodiment of the method according to the fourth aspect of the present invention, the method further comprises evaluating the calculated manufacturing fault costs for identifying significant welding operations performed by welding units of the production facility.

In a possible embodiment of the method according to the fourth aspect of the present invention, the method further comprises controlling welding operations performed by welding units of the production facility to reduce manufacturing fault costs of identified target entity types.

The invention provides according to a fifth aspect an evaluation apparatus for a production facility. This evaluation apparatus comprises an evaluation apparatus for a production facility having at least one welding unit providing weld data during welding operations of mechanical entities forming part of an assembly to be manufactured by said production facility wherein the provided weld data associated with welded mechanical entities is processed to calculate for different entity types required manufacturing fault costs evaluated by said evaluation apparatus to identify significant welding operations of said production facility.

These and other aspects of the present invention will become apparent from the following description. In the description, reference is made to the accompanying drawings illustrating different aspects of the present invention in more detail. As illustrated embodiment does not necessarily represent the full scope of the present invention and reference is made therefore, to the claims herein for interpreting the scope of the present invention.

DETAILED DESCRIPTION OF EMBODIMENTS

Figure 1:
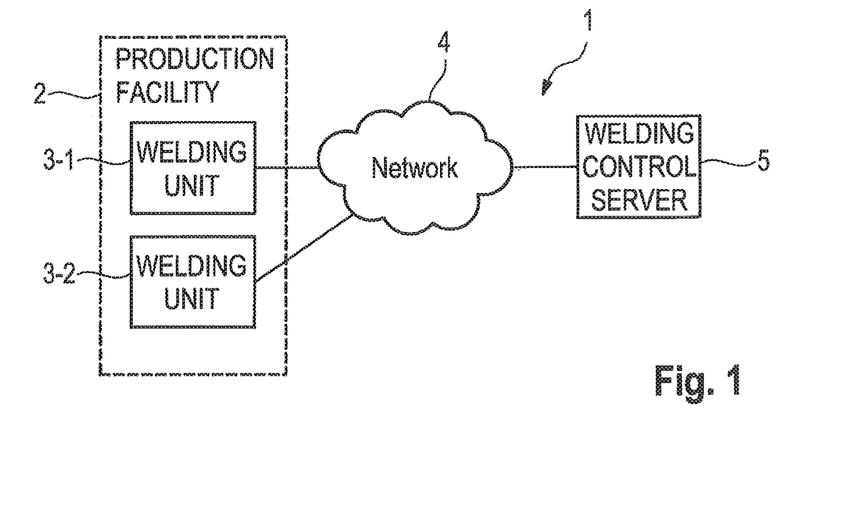
FIG. 1 shows a block diagram illustrating a possible exemplary embodiment of a welding control system according to an aspect of the present invention.

As can be seen in FIG. 1 illustrating an exemplary embodiment of a welding control system 1 according to the first aspect of the present invention, a production facility 2 can comprise a plurality of welding units 3-1, 3-2 which can be connected via a network 4 to a welding control server 5 of the welding control system 1. The number of welding units in the production facility 2 can vary. In a possible embodiment, the production facility 2 comprises as an example two welding units as illustrated in FIG. 1. The welding units 3-$i$ can perform the same or different welding operations to weld mechanical entities forming part of an assembly to be manufactured by said production facility 2. The production facility 2 can form part of a production plant or a repair shop. The welding units 3-$i$ can be connected by means of a local area network LAN of a factory. The local area network LAN can be an Ethernet network connecting the welding units 3-$i$ to a welding control server 5. In an alternative embodiment, the welding control server 5 can be a remote server connected via a data network 4 such as the internet to a gateway of the local area network LAN connecting the welding units 3-$i$ of the production facility 2. The welding units 3-$i$ within the production facility 2 are configured to provide during welding operations to join mechanical entities ME forming part of the assembly to be manufactured by said production facility weld data WD associated with the respective mechanical entities ME. Each welding operation such as arc welding is performed by a welding unit 3-*i* to generate a welding seam with an associated welding seam identifier WS-ID to weld at least two mechanical entities ME together for manufacturing a more complex mechanical entity ME of the assembly employing adjustable welding parameters. The welding parameters employed during a welding operation performed by a welding unit 3-*i* for instance comprise a welding current, a welding voltage, a gas flow rate, a gas type, a wire feed speed or a used wire type. Depending on the type of welding operation performed by the welding unit 3-*i*, other adjustable welding parameters are provided. The weld data provided by the welding unit 3-*i* during the welding operation can in a possible embodiment comprise identifiers of the affected mechanical entities, a welding seam identifier WS-ID of the generated welding seam, time indicators indicating the time of the welding operations such as time stamps TS, an identifier of the welding unit 3-*i*, welding parameters employed by the welding units 3-*i* in the respective welding operation, and possibly an identifier of the welding operator or welding user. In a possible embodiment, the welding unit 3-*i* can comprise all kinds of power source. In a possible exemplary embodiment, the welding unit 3-*i* can perform a MIG/MAG welding. In a MIG/MAG welding, a consumable metal electrode is both filler material and arc carrier. An endless filler wire is fed via drive rollers to a welding torch, where the electrical current is transferred at the contact tube. The wire feed is concentrically surrounded by a gas nozzle. The shielding gas that flows out prevents chemical reactions between the hot workpiece surface and the surrounding air. This maintains the strength and durability of the weld metal. Inert and active gases can be used as shielding gases. This welding is called metal inert gas MIG welding and metal active gas MAG welding.

The power source of the welding unit 3-*i* operates for instance using a direct current, wherein the potential of the filler wire represents the positive pole. The power source can have a transformer with a sufficient number of switchable steps in order to reach a desired welding current. A rectifier is located downstream from the transformer and generates a rectified welding current from the alternative current. An adjustable induction coil can smooth out unwanted current peaks, thereby reducing the tendency to produce welding spatter. Wire feeding is provided by either an integrated wire drive inside the power source housing or by an external wire feed unit. Manual or machine welding torches can be gas-cooled or water-cooled. The Power Source can also be an inverter from the state of the art.

In a possible embodiment, the weld data WD provided by the welding unit 3-*i* can also comprise a serial number, type and location of the power source of the welding unit. In a further possible embodiment, the weld data can also comprise additional data such as an IP address of the power source of the welding unit 3-*i*.

Figure 2:
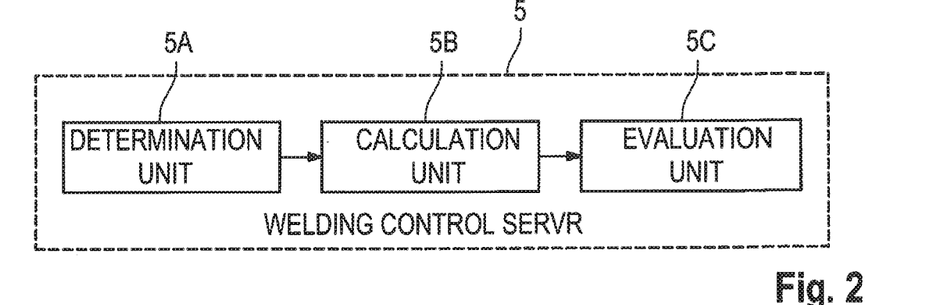
FIG. 2 shows a block diagram of a possible exemplary embodiment of a welding control server according to an aspect of the present invention.

As illustrated in FIG. 1, the welding units 3-*i* comprising power sources are connected via the network 4 to the welding control server 5. FIG. 2 shows an exemplary embodiment of a welding control server 5 which can be used in a welding control system 1 of the present invention. In the shown exemplary embodiment of FIG. 2, the welding control server 5 comprises at least or for example a determination unit 5A, a calculation unit 5B and an evaluation unit 5C. In general this units 5A to 5C are functional parts of a software program which runs on the welding control server 5. The determination unit 5A of the welding control server 5 as illustrated in FIG. 2 is configured to determine for each type of mechanical entity ME a corresponding welding error rate WER on the basis of weld data WD received from the welding units 3-*i* of the production facility 2. The network 4 shown in FIG. 1 can be a wired or wireless network for transporting data. The network 4 is provided to transport weld data WD from the different welding units 3-*i* of the production facility 2 to the welding control server 5 in real time or periodically. The welding control server 5 is configured to transmit fault handling control signals FHCS generated by its evaluation unit 5C for reduction of manufacturing fault costs of identified target entity types via the network 4 to the welding units 3-*i* used to manufacture the identified target entity types.

The determination unit 5A of the welding control server 5 is configured to determine for each type of mechanical entity ME a corresponding welding error rate WER on the basis of the weld data received from the welding units 3-*i*. The weld data WD of the welding operation performed by a welding unit 3-*i* can be assigned to a specific mechanical entity of the assembly to be manufactured by the production facility 2 on the basis of an article number and/or a serial number of the respective entity indicated by the respective welding unit of the production facility 2. In a possible embodiment, each entity type of a mechanical entity MET can be indicated by an associated article number. Further, each basic and/or complex mechanical entity used in the production of the assembly can comprise an associated unique serial number. In a possible embodiment, the weld data WD of mechanical entities ME of the same investigated entity type received by the determination unit 5A during a predetermined observation time period are processed by the determination unit 5A to determine an instantaneous current welding error rate WER for the investigated entity type MET.

The calculation unit 5B of the welding control server 5 is configured to calculate for each type of mechanical entity ME the number of faulty mechanical entities of the respective entity type within the assembly depending on the number of mechanical entities ME of this type used within the assembly and the determined welding error rate received from the determination unit 5A. The calculation unit 5B is further configured to weight the calculated number of faulty mechanical entities of the respective entity type with a predetermined manufacturing effort value MEV of said entity type MET to calculate the required fault efforts, for example the required fault costs for the different entity types. In a possible exemplary embodiment, the calculation unit 5B comprises one or several microprocessors which can be programmed to perform the necessary calculations. In this exemplary embodiment, the calculation unit 5B can comprise a programming interface to load a calculation program from a data carrier. In a possible embodiment, the calculation performed by the calculation unit 5B is performed in real time.

The welding control server 5 further comprises an evaluation unit 5C which is configured to evaluate the manufacturing fault efforts output by the calculation unit 5B to identify significant welding operations performed by the welding units 3-*i* of the production facility 2. Significant welding operations have a significant impact on the total fault costs of the assembly.

Each mechanical entity ME of the assembly to be manufactured by the production facility 2 is formed by basic mechanical entities and by complex mechanical entities. Basic mechanical entities can comprise for instance mechanical components such as plates, screws, etc. or raw material components supplied to the production facility 2. A complex mechanical entity consists of other assembled and/or welded mechanical entities. In the production process, more and more complex mechanical entities are produced to finally generate a complex mechanical assembly consisting of a plurality of components such as a vehicle chassis of a vehicle or a ship. In a possible embodiment, the evaluation unit 5C of the welding control server 5 is configured to evaluate for each entity type of a complex mechanical entity a total welding fault rate of each welding unit and/or welding operator and/or the like (gas, process, time, . . . ) employed in manufacturing the respective complex mechanical entity. In a still further possible embodiment, the evaluation unit 5C can be further configured to evaluate for different welding operations performed by a welding unit 3-*i* and/or welding operator employed in the manufacturing of a complex mechanical entity their respective contribution to the total welding fault rate of the respective welding unit and/or welding operator.

The welding control system 1 as illustrated in FIG. 1 can be a central control system comprising a single welding control server 5 or a distributed welding control system having several servers performing the same or different monitoring functions. In a still further possible embodiment of the welding control system 1 according to the first aspect of the present invention, the welding control server 5 can have access to a database storing additional data about the production process performed by the production facility 2. In a possible embodiment, the database comprises data concerning the mechanical assembly to be manufactured by the production facility 2 such as a data model, in particular a computer-aided design model of the assembly. In a still further possible embodiment, the database can comprise an ontology of the different mechanical components or mechanical entities assembled to provide the final assembly to be produced by the production facility 2. In this embodiment, the welding control server 5 can have knowledge about the structure of the final assembly or complex entities within the assembly. In a possible embodiment, the calculation unit 5B is configured to sort the entity types MET according to the corresponding required manufacturing fault costs calculated for the entity types to identify relevant target entity types. These relevant target entity types can be complex entity types where faulty welding seams have a strong impact on the final assembly. In a possible embodiment, welding parameters employed during the welding operations performed by the welding units 3-*i* of the production facility 2 to manufacture the identified relevant target entity types are identified by the evaluation unit 5*c* and optimized to reduce the required manufacturing fault costs of these target entity types. In a possible embodiment, the evaluation unit 5C of the welding control server 5 can generate fault handling control signals FHCS for reduction of manufacturing fault costs of the identified target entity types. The generated fault handling control signals FHCS can be transmitted via the network 4 to the welding units 3-*i* used to manufacture the identified target entity types. The evaluation unit 5C can be further configured to generate alarm signals if the calculated manufacturing fault costs of an entity type MET exceed an adjustable threshold value. In a possible embodiment of the welding control server 5 as illustrated in FIG. 2, the welding control server 5 can further comprise a user interface, in particular a graphical user interface GUI, for a welding operator to adjust welding parameters of different welding units 3-*i* and to output the received weld data generated by the welding units 3-*i* of the production facility 2. In a possible embodiment, the welding control server 5 can be integrated in an apparatus which can be carried and connected to a local area network LAN of the production facility 2 via a data interface. In a further possible embodiment of the welding control server 5, the received weld data and/or the output control signals can be stored in a data memory for later investigations made for optimization of the welding processes in the production facility 2.

Figure 3:
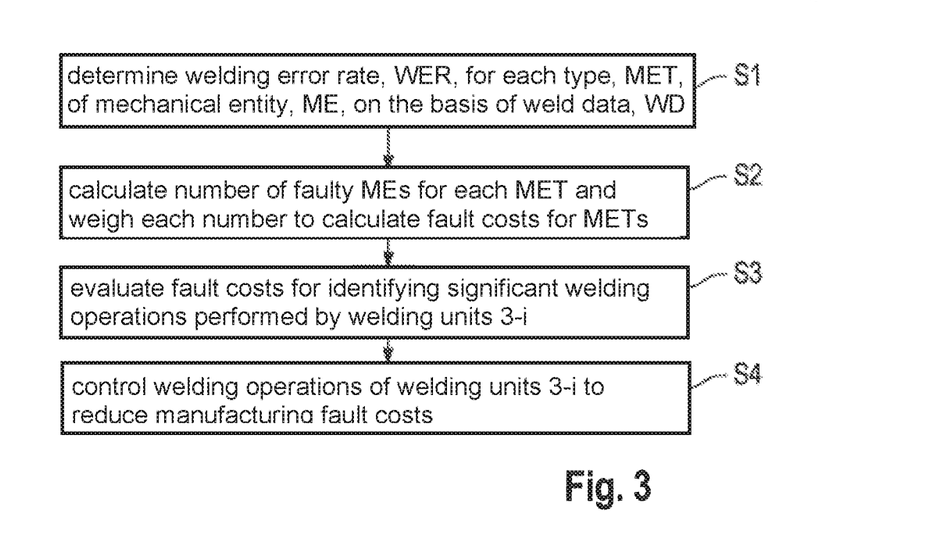
FIG. 3 is a flow chart illustrating a possible exemplary embodiment of a method for monitoring welding operations according to an aspect of the present invention.

FIG. 3 shows a flowchart for illustrating a possible exemplary embodiment of a method for monitoring welding operations according to an aspect of the present invention. The method for monitoring welding operations of a plurality of welding units 3-*i* within a production facility 2 can comprise several steps.

In a first step S1, it is determined for each type of mechanical entity MET a corresponding welding error rate WER on the basis of weld data WD received from welding units 3-*i* of the production facility 2.

In a further step S2, for each type of mechanical entity MET the number of faulty mechanical entities ME of the respective entity type within the assembly is calculated depending on the number of mechanical entities used within said assembly and the welding error rate WER of the respective entity type determined in step S1. Further, the calculated number of faulty mechanical entities of the respective entity type is weighed with a predetermined manufacturing effort value MEV of the entity type stored in a database to calculate the required fault costs for different entity types.

In a further step S3, the calculated manufacturing fault costs are evaluated for identifying significant welding operations performed by the welding units 3-*i* of the production facility. In a possible embodiment, the entity types MET are sorted according to the corresponding required manufacturing fault costs to identify relevant target entity types. In a possible embodiment, for each entity type of a complex mechanical entity, a total welding fault rate is evaluated. Further, for different welding operations performed by a welding unit employed in the manufacturing of the complex mechanical entity, their respective contribution to the total welding fault rate can be evaluated.

In a possible embodiment, in a further step S4, welding operations performed by welding units 3-*i* of the production facility 2 are controlled to reduce manufacturing fault costs of identified target entity types.

Figure 4:
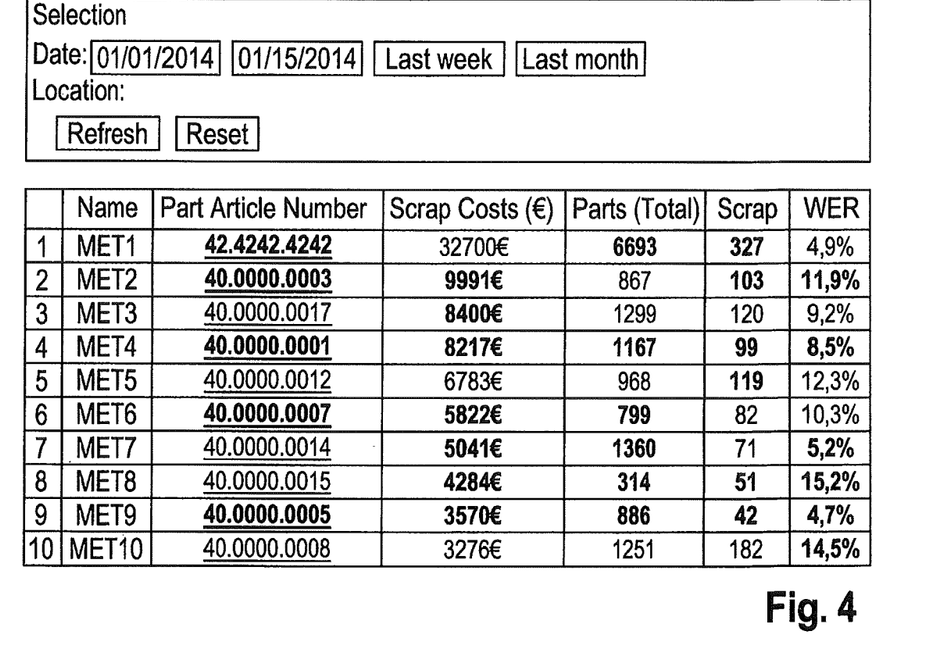
FIG. 4 is a diagram illustrating the operation of a welding control system according to the present invention in a use case.

FIG. 4 illustrates a table of an exemplary use case, where the method and apparatus according to the present invention can be used. In the shown table, several different mechanical entity types MET1, MET2 . . . MET10 are illustrated. Each mechanical entity type can be a complex mechanical entity type such as an exhaust tube of a car formed from other mechanical entities or basic component. For each type of mechanical entity MET in the table of FIG. 4, a corresponding article number is illustrated identifying the respective mechanical entity type. The article number is shown in the second column of the table. For each entity type, a corresponding welding error rate WER is determined on the basis of weld data WD received from welding units 3-*i* of the production facility 2 and/or quality checks. In the table of FIG. 4, the welding error rate WER is illustrated in the last column of the table. For instance, the mechanical entity type MET1 with the article number 4242424242 has a welding error rate WER of 4.9%. The welding error rate WER can be determined in a possible embodiment by the determination unit 5A of the welding control server 5. For each type of mechanical entity MET, the number of faulty mechanical entities ME of the respective entity type MET within the assembly shown in the fifth column of the table is calculated depending on the number of mechanical entities ME within the assembly as shown in the fourth column of the table and the determined welding error rate WER of the respective entity type. In the shown exemplary use case for the mechanical entity of the entity type MET1 (for instance an exhaust tube), the total number of parts is 6693 with a determined welding error rate WER=4.9% so that the number of faulty parts or mechanical entities of this entity type is 6693×4.9%=328. The calculated number of faulty mechanical entities of the respective entity type is weighed with a predetermined manufacturing effort value MEV of the respective entity type to calculate required fault costs for the different entity types. In this specific use case, the manufacturing fault value of a faulty mechanical entity of the first type MET1 (exhaust tube) may be for instance 100 Euro for each faulty exhaust tube. Accordingly, the scrap costs or manufacturing fault costs of the faulty parts of the mechanical entity type MET1 amount to 327×100 Euro=32700 Euro as shown in the table of FIG. 4 in the third column. As can be seen in FIG. 4, the different types of mechanical entities are sorted/weighted according to the calculated fault costs. The table illustrates for example that a welding seam generated during a welding operation by a welding unit 3-$i$ affecting mechanical entities of the first mechanical entity type ME1 has the most severe negative impact on the total production costs of the assembly. The calculated manufacturing fault efforts are evaluated to identify the most significant welding operations performed by the welding units 3-$i$ of the production facility 2 which are most critical for the complete assembly. In a possible exemplary embodiment, the table illustrated in FIG. 4 can be displayed to a quality controller of the production facility 2 via a graphical user interface GUI of the welding control server 5 shown in FIG. 2. The displayed table shows the quality controller clearly which welding processes or welding operations are most critical so that he can focus on optimizing these welding operations, for instance by adjusting welding parameters employed in the respective welding operations. In the shown use case of FIG. 4, the quality controller can focus on optimizing welding operations affecting the mechanical entities of the first mechanical entity type ME1 and not on optimizing the welding operations affecting mechanical entities MET1 of the entity type MET10, although the welding error rate WER of these mechanical entities is higher (14.5%) than the welding error rate WER of the first mechanical entity type MET1 (4.9%).

As can be seen in FIG. 4, the evaluation of the calculated manufacturing fault costs can be performed automatically to identify significant welding operations and critical target entity types.

Figure 5:
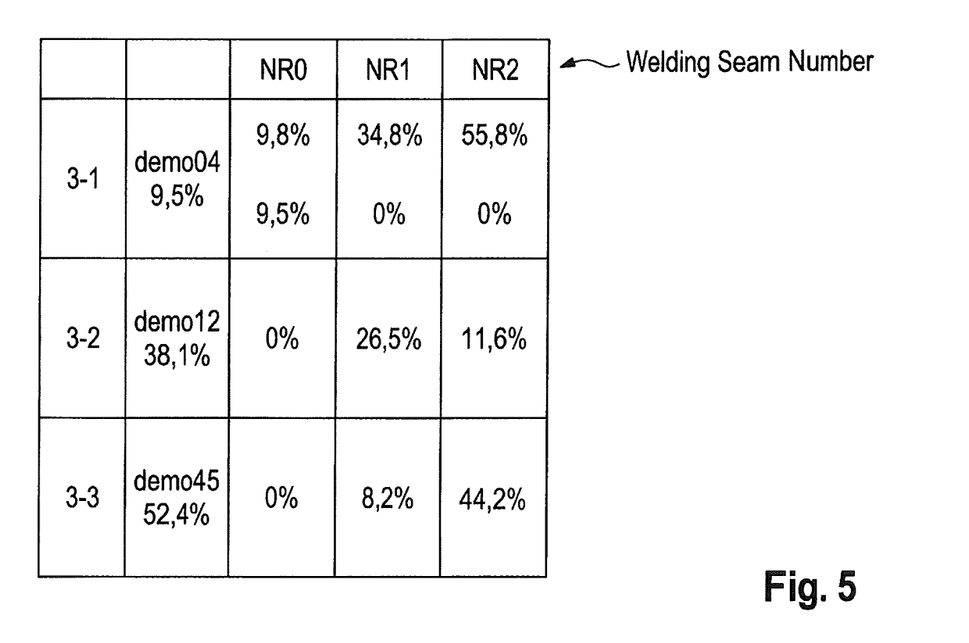
FIG. 5 shows a further diagram for illustrating a possible implementation of a welding control system according to an aspect of the present invention in a use case.

In a further possible embodiment of the welding control system 1 according to the present invention, it is possible to evaluate each entity type, for instance entity type MET1 (exhaust tube) a total welding fault rate for each welding unit employed in manufacturing the respective complex mechanical entity as illustrated in FIG. 5. FIG. 5 shows for example a two-dimensional presentation for a further evaluation performed for the specific mechanical entity type MET1 (exhaust tube), wherein three machines or welding units 3-$i$ are employed having welding fault rates of 9.5%, 38.1% and 52.4%, respectively. It is also possible to create a three or more dimensional presentation. For different welding operations performed by a welding unit employed in manufacturing the complex mechanical entity of the type MET1, the respective contribution to the total welding fault rate of the respective welding unit can be evaluated as well as shown in FIG. 5. In the shown example, the different welding operations concern different welding joints with associated welding joint numbers 0, 1, 2. The welding joints can be formed by welding seams or e. g. welding spots. In a possible embodiment the welding unit can also be a spot welder. The first welding unit 3-1 having a fault rate of 9.5% generates a welding seam 0 with a fault rate of 9.5%. The second welding unit 3-2 having a total welding fault rate of 38.1% has a fault rate of 26.5% for the welding seam with the welding seam number 1 and a fault rate of 11.6% for the welding seam with the welding seam number 2. The third welding unit 3-3 with a fault rate of 52.4% has a fault rate of 8.2% for the welding seam with the welding seam number 1 and 44.2% for welding seam with the welding seam number 2. FIG. 5 shows an exemplary two-dimensional presentation of different machines or welding units 3-$i$ with different seams and different seam numbers. Further evaluations are also possible for any welding parameter such as gas flow rate, welding time, welding voltage or wire feed etc. The operator or controller can immediately identify the most significant affected critical target entities and react accordingly, for instance by adjusting the corresponding welding parameters of a welding unit 3-$i$. For instance, a welding operator or a controller can react to adjust at a welding unit 3-$i$ a specific welding operation concerning a welding seam with an associated welding seam number and adjust the employed welding parameters generating this welding seam, for instance a welding current and/or a welding voltage.

The welding control system 1 according to the present invention can be used for optimizing welding processes within production facilities. Further, the welding control system 1 according to the present invention can be used to monitor the performance of welding operators working at different welding units 3-$i$ of the production facility 2. Further, the welding control system 1 according to the present invention can be used to monitor the performance of different welding units 3-1 over time for replacement or repair purposes. Moreover, the welding control system 1 can be used for optimizing maintenance in a production facility 2. The welding control system 1 can further be used to control welding operations of welding units 3-$i$ during operation of the production facility 2 in real time to minimize waste and to maximize the output of manufactured assemblies.

The invention claimed is:

1. A welding control system for controlling welding operations of welding units of a production facility in real-time, wherein sensor devices of the welding units are adapted to provide weld data associated with respective mechanical entities, during welding operations of mechanical entities, forming part of an assembly to be manufactured by said production facility, wherein the mechanical entities are workpieces to be welded by the welding units, wherein said welding control system includes a welding control server which comprises:

a determination unit configured and operable to determine for each type of mechanical entity indicated by an associated article number a corresponding welding error rate on the basis of weld data received from the sensor devices of the welding units of said production facility;

a calculation unit including one or several microprocessors each configured and operable to;

calculate in real-time, for each type of mechanical entity, the number of faulty mechanical entities of the respective type of mechanical entity within said assembly, and weight the calculated number of faulty mechanical entities of the respective entity type with a predetermined manufacturing effort value of said type of mechanical entity to calculate in real-time required manufacturing fault costs for the different types of mechanical entities; and an evaluation unit configured and operable to;

evaluate the calculated manufacturing fault costs to identify significant welding operations of said production facility, the identified significant welding operations being welding operations that generate welding seams on those types of mechanical entities having highest manufacturing fault costs, generate fault handling control signals for reduction of the manufacturing fault costs of target types of mechanical entities, the target types of mechanical entities being at least partially manufactured using the identified significant welding operations, and generate alarm signals when the calculated manufacturing fault costs of a target type of mechanical entity exceed a threshold value, wherein the welding units of said production facility are connected via a network to the welding control server, wherein said network is provided to transport weld data from the sensor devices of the welding units of said production facility to said welding control server in real-time, wherein the welding control server is configured and operable to transmit the fault handling control signals generated by the evaluation unit via said network to target welding units that are used to manufacture said target types of mechanical entities to control the welding operations of the target welding units by adjusting the welding parameters of said target welding units in real-time to minimize waste and to maximize the output of manufactured assemblies, the welding parameters including at least one of a welding current, a welding voltage, a gas flow rate, a gas type, a wire feed speed, and a wire type.

2. The welding control system according to claim 1 wherein the at least one microprocessor of the calculation unit is configured to calculate for each type of mechanical entity the number of faulty mechanical entities of the respective type of mechanical entity within said assembly depending on the number of mechanical entities used within said assembly and the determined welding error rate of the respective type of mechanical entity and further configured to weight the calculated number of faulty mechanical entities of the respective type of mechanical entity with a predetermined manufacturing effort value of said type of mechanical entity to calculate in real-time required manufacturing fault costs for the different types of mechanical entities.

3. The welding control system according to claim 1, wherein each mechanical entity of said assembly is formed by a basic mechanical entity or by a complex mechanical entity consisting of at least one of other assembled mechanical entities and welded mechanical entities.

4. The welding control system according to claim 1, wherein the evaluation unit is further configured to evaluate for each type of mechanical entity of a complex mechanical entity a total welding fault rate of each of at least one of welding units, welding operators and welding time employed in manufacturing the complex mechanical entity.

5. The welding control system according to claim 1, wherein the evaluation unit of the welding control server is further configured to evaluate for different welding operations performed by at least one of a welding unit and a welding operator employed in the manufacturing of a complex mechanical entity their respective contribution to the total welding fault rate of the respective one of the at least one of a welding unit and a welding operator.

6. The welding control system according to claim 1, wherein each welding operation is performed by a welding unit to generate a welding seam with an associated welding seam identifier to join at least two mechanical entities together for manufacturing a complex mechanical entity of said assembly employing adjustable welding parameters.

7. The welding control system according to claim 1, wherein the weld data provided by a sensor device of a welding unit of the production facility during a welding operation comprises at least one of:

identifiers of the affected mechanical entities and a welding seam identifier of the produced welding seam and a time indicator indicating the time of the welding operation and an identifier of the welding unit and welding parameters employed by the welding unit in the respective welding operation, and an identifier of the welding operator.

8. The welding control system according to claim 1, wherein the calculation unit of the welding control server is configured to sort the types of mechanical entities according to the corresponding required manufacturing fault costs calculated in real-time for said types of mechanical entities to identify relevant target types of mechanical entities.

9. The welding control system according to claim 1, wherein welding parameters employed during welding operations performed by welding units of said production facility to manufacture the identified relevant target types of mechanical entities are identified by the evaluation unit of the welding control server and optimized to reduce the required manufacturing fault costs of said target types of mechanical entities.

10. The welding control system according to claim 1, wherein the type of a mechanical entity is indicated by the associated article number and wherein each of at least one of basic mechanical entities and complex mechanical entities include an associated unique serial number.

11. The welding control system according to claim 10, wherein weld data of a welding operation performed by a welding unit are assigned to a specific mechanical entity of the assembly on the basis of at least one of the article number and the serial number of the respective mechanical entity indicated by the respective welding unit of said production facility.

12. The welding control system according to claim 1, wherein the weld data of mechanical entities of the same investigated type of mechanical entity received during a predetermined time period are processed by at least one microprocessor of the determination unit of the welding control server to determine an instantaneous welding error rate for the investigated type of mechanical entity.

13. A production facility comprising:

a plurality of welding units having sensor devices to provide weld data during welding operations of mechanical entities forming part of an assembly to be manufactured by said production facility, wherein the mechanical entities are workpieces to be welded by the welding units and wherein the weld data is associated with welded mechanical entities; and a welding control system configured and operable to monitor or control, or to monitor and control, in real-time welding operations performed by said welding units of said production facility, wherein said welding control system comprises at least one welding control server having:
  a determination unit configured and operable to determine for each type of mechanical entity indicated by an associated article number a corresponding welding error rate on the basis of weld data received from the sensor devices of the welding units of said production facility;
  a calculation unit including one or several microprocessors configured and operable to;
    calculate in real-time, for each type of mechanical entity, the number of faulty mechanical entities of the respective type of mechanical entity within said assembly, and
    weight the calculated number of faulty mechanical entities of the respective type of mechanical entity with a predetermined manufacturing effort value of said type of mechanical entity to calculate in real-time required manufacturing fault costs for the different types of mechanical entities; and
  an evaluation unit configured and operable to;
    evaluate the calculated manufacturing fault costs to identify significant welding operations performed by the welding units of the production facility, the identified significant welding operations being welding operations that generate welding seams on those types of mechanical entities having highest manufacturing fault costs,
    generate fault handling control signals for reduction of the manufacturing fault costs of target types of mechanical entities, the target types of mechanical entities being at least partially manufactured using the identified significant welding operations, and
    generate alarm signals when the calculated manufacturing fault costs of a target type of mechanical entity exceed a threshold value,
  wherein the welding units of the production facility are connected via a network to the welding control server, wherein said network is provided to transport weld data from the sensor devices of the welding units of said production facility to said welding control server in real-time,
  wherein the welding control server is configured and operable to transmit the fault handling control signals generated by the evaluation unit via said network to target welding units that are used to manufacture said target types of mechanical entities to control the welding operations of said target welding units by adjusting the welding parameters of said target welding units in real-time to minimize waste and to maximize the output of the manufactured assemblies, the welding parameters including at least one of a welding current, a welding voltage, a gas flow rate, a gas type, a wire feed speed, and a wire type.

14. The production facility of claim 13, wherein the at least one microprocessor of the calculation unit of the welding control server is configured to calculate in real-time for each type of mechanical entity the number of faulty mechanical entities of the respective type of mechanical entity within said assembly depending on the number of mechanical entities used within said assembly and the determined welding error rate of the respective type of mechanical entity and further configured to weight the calculated number of faulty mechanical entities of the respective type of mechanical entity with a predetermined manufacturing effort value of said type of mechanical entity to calculate in real-time required manufacturing fault costs for the different types of mechanical entities.

15. A welding unit of a production facility adapted to weld at least two mechanical entities at a welding seam together for generating a complex mechanical entity of an assembly to be manufactured by said production facility, wherein the mechanical entities are workpieces to be welded by the welding unit, and wherein said welding unit is monitored or controlled, or monitored and controlled, by a welding control system comprising at least one welding control server having:
  a determination unit configured and operable to determine for each type of mechanical entity indicated by an associated article number a corresponding welding error rate on the basis of weld data received from sensor devices of welding units of said production facility;
  a calculation unit including one or several microprocessors configured and operable to;
    calculate, for each type of mechanical entity, the number of faulty mechanical entities of the respective type of mechanical entity within said assembly depending on the number of mechanical entities used within said assembly and the determined welding error rate of the respective type of mechanical entity, and
    weight the calculated number of faulty mechanical entities of the respective type of mechanical entity with a predetermined manufacturing effort value of said type of mechanical entity to calculate in real-time required manufacturing fault costs for the different types of mechanical entities; and
  an evaluation unit configured and operable to;
  evaluate the calculated manufacturing fault costs to identify significant welding operations performed by welding units of said production facility, the identified significant welding operations being welding operations that generate welding seams on those types of mechanical entities having highest manufacturing fault costs,
  generate fault handling control signals for reduction of the manufacturing fault costs of target types of mechanical entities, the target types of mechanical entities being at least partially manufactured using the identified significant welding operations, and
  generate alarm signals when the calculated manufacturing fault costs of a target type of mechanical entity exceed a threshold value,
  wherein the welding unit is connected via a network to the welding control server, wherein said network is provided to transport weld data from sensor devices of welding units of said production facility to said welding control server in real-time,
  wherein the welding control server is configured and operable to transmit fault handling control signals generated by the evaluation unit via said network to target welding units that are used to manufacture said target types of mechanical entities to control the welding operations of the welding units by adjusting the welding parameters of the welding units in real-time to minimize waste and to maximize the output of the manufactured assemblies, the welding parameters including at least one of a welding current, a welding voltage, a gas flow rate, a gas type, a wire feed speed, and a wire type.

16. An evaluation apparatus for a production facility comprising welding units having sensor devices to provide weld data during welding operations of mechanical entities forming part of an assembly to be manufactured by said production facility, wherein the mechanical entities are workpieces to be welded by the welding units and wherein the provided weld data associated with welded mechanical entities is processed in real-time to:
- calculate for different types of mechanical entities indicated by an associated article number required manufacturing fault costs evaluated by said evaluation apparatus to identify significant welding operations of said production facility, the identified significant welding operations being welding operations that generate welding seams on those types of mechanical entities having highest manufacturing fault costs;
- generate fault handling control signals for reduction of manufacturing fault costs of target types of mechanical entities transmitted to the welding units used to manufacture said target types of mechanical entities, the target types of mechanical entities being at least partially manufactured using the identified significant welding operations;
- control the welding operations of the target welding units that are used to manufacture said target types of mechanical entities to control the welding operations of the welding units by adjusting the welding parameters of the target welding units in real-time to minimize waste and to maximize the output of the manufactured assemblies, the welding parameters including at least one of a welding current, a welding voltage, a gas flow rate, a gas type, a wire feed speed, and a wire type; and
- generate alarm signals when the calculated manufacturing fault costs of a target type of mechanical entity exceed a threshold value.

17. A method for controlling in real-time welding operations of a plurality of welding units within a production facility, wherein sensor devices of the welding units provide weld data associated with the respective mechanical entities during welding operations of mechanical entities forming part of an assembly to be manufactured by said production facility, wherein the mechanical entities are workpieces to be welded by the welding units, said method comprising:
- determining for each type of mechanical entity indicated by an associated article number a corresponding welding error rate on the basis of weld data received from welding units of said production facility;
- calculating in real-time for each type of mechanical entity the number of faulty mechanical entities of the respective type of mechanical entity within said assembly;
- weighting the calculated number of faulty mechanical entities of the respective type of mechanical entity with a predetermined manufacturing effort value of said type of mechanical entity to calculate in real-time required manufacturing fault costs for the different types of mechanical entities;
- evaluating the calculated manufacturing fault costs to identify significant welding operations performed by welding units of said production facility to generate fault handling control signals for reduction of the manufacturing fault costs of target types of mechanical entities, the target types of mechanical entities being at least partially manufactured using the identified significant welding operations, the identified significant welding operations being welding operations that generate welding seams on those types of mechanical entities having highest manufacturing fault costs;
- transmitting the generated fault handling control signals to target welding units that are used to manufacture said target types of mechanical entities;
- controlling in real-time welding operations performed by said target welding units used to manufacture said target types of mechanical entities by adjusting the welding parameters of said welding units to minimize waste and to maximize output of manufactured assemblies, the welding parameters including at least one of a welding current a welding voltage, a gas flow rate, a gas type, a wire feed speed, and a wire type; and
- generating alarm signals when the calculated manufacturing fault costs of a target type of mechanical entity exceed a threshold value.

18. The method according to claim 17, wherein the calculating for each type of mechanical entity the number of faulty mechanical entities of the respective type of mechanical entity within said assembly is performed in real-time depending on the number of mechanical entities used within said assembly and the determined welding error rate of the respective type of mechanical entity, wherein the calculated number of faulty mechanical entities of the respective type of mechanical entity is weighted with the predetermined manufacturing effort value of said type of mechanical entity to calculate in real-time the required manufacturing fault costs for the different types of mechanical entities.

* * * * *